United States Patent [19]
Krauss

[11] Patent Number: 6,165,591
[45] Date of Patent: Dec. 26, 2000

[54] UNDER VEHICLE FLOOR MAT

[76] Inventor: Melvin Krauss, Box 148, Rouleau, Saskatchewan, Canada, S0G 4H0

[21] Appl. No.: 09/166,856

[22] Filed: Oct. 6, 1998

[51] Int. Cl.⁷ ...................................................... B32B 3/08
[52] U.S. Cl. ............................ 428/192; 428/81; 184/106; 296/38
[58] Field of Search ......................... 428/81, 192; 5/417; 296/97.23, 38; 184/106

[56] References Cited

U.S. PATENT DOCUMENTS 4,634,618  1/1987  Greer et al. ................................ 428/81

*Primary Examiner*—Alexander S. Thomas
*Attorney, Agent, or Firm*—Murray E. Thrift; Adrian D. Battison; Michael R. Williams

[57] ABSTRACT

A mat is used for protecting a floor under a vehicle from dripping snow, salt or water or from leaking oil or other contaminants. The mat is formed from an impervious sheet of flaccid material, folded over at the edges to provide a peripheral sleeve. An incompressible rope extends the length of the sleeve to provide a peripheral lip that will retain contaminants on top of the mat for subsequent removal using a suction pump.

4 Claims, 1 Drawing Sheet

UNDER VEHICLE FLOOR MAT

FIELD OF THE INVENTION

The present invention relates to a mat, and more particularly to a mat for protecting a floor from contaminants dropping from a vehicle positioned over the floor.

BACKGROUND

Floors on which vehicles are parked, e.g. garage floors, are often contaminated by water, salt, oil and other materials that drip or leak from the vehicles. One proposal to control this is disclosed in U.S. Pat. No. 5,308,670, which discloses a pad of vinyl with the edges formed into sleeves, and rubber hose extending along the sleeves to form raised edges. This creates a basin to catch material falling off the vehicles. In use, this cover is placed under a vehicle that has been parked. This means that there are parts of the vehicle, particularly around the wheels where falling material is not captured. If the vehicle is moved without removing the pad, any accidental passage of the wheels over the pad will collapse the rubber hose, allowing the contents of the pad to run off.

The present invention proposes an improved device of this type.

SUMMARY

According to the present invention there is provided a mat for placing on a floor to protect the floor from foreign material falling from a vehicles, said mat comprising an impervious sheet of flexible, puncture-resistant material larger in length and width dimensions than the vehicle, a sleeve extending around the periphery of the sheet, and a substantially incompressible rope extending along the sleeve, around the periphery of the sheet to provide an incompressible raised lip around the periphery of the mat.

With this mat the vehicle can be driven on to and off of the mat. The impervious mat protects the floor from dripping or leaking materials. The raised edge provided by the rope contains liquids preventing them from running off. The rope is incompressible so that it will not collapse and allow the run-off of contaminants when driven over by a vehicle.

When sufficient contaminants have been collected on the mat, they can be pumped out with a suction pump.

The mat is preferably a tarpaulin including a textile fabric and a synthetic resin matrix. The preferred material is a nylon fabric with a polyvinylchloride (PVC) coating. This material is flaccid, allowing the mat to be folded for storage. It is resistant to puncture and tearing.

BRIEF DESCRIPTION OF THE DRAWINGS

In the accompanying drawings, which illustrate an exemplary embodiment of the present invention.

DETAILED DESCRIPTION

Figure 1:
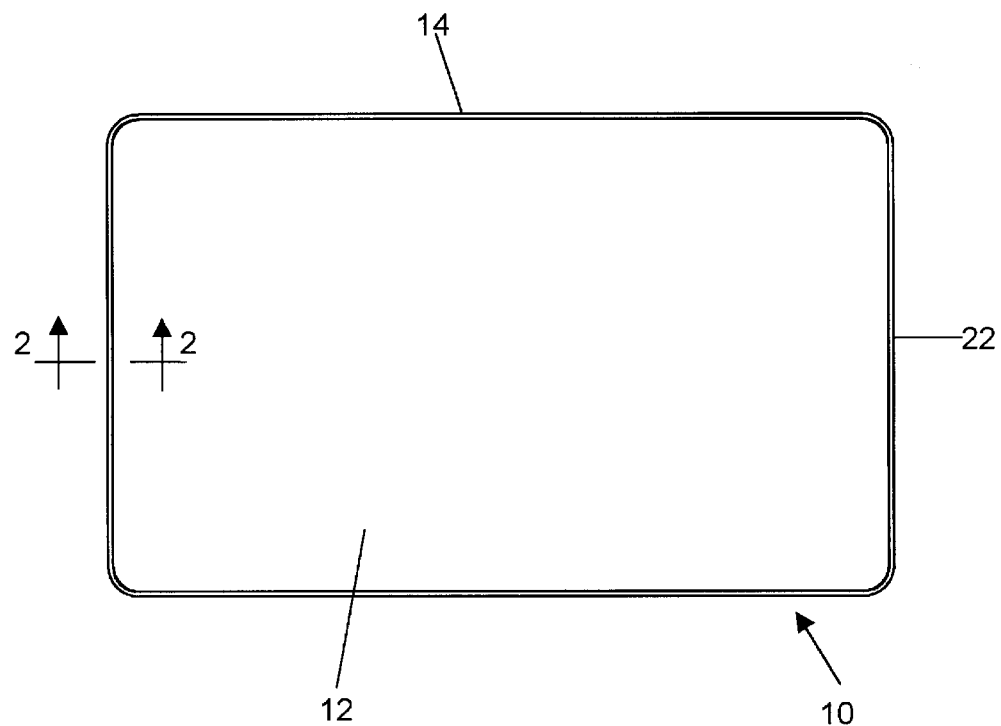
FIG. 1 is a plan view of the mat according to the present invention.
Figure 2:
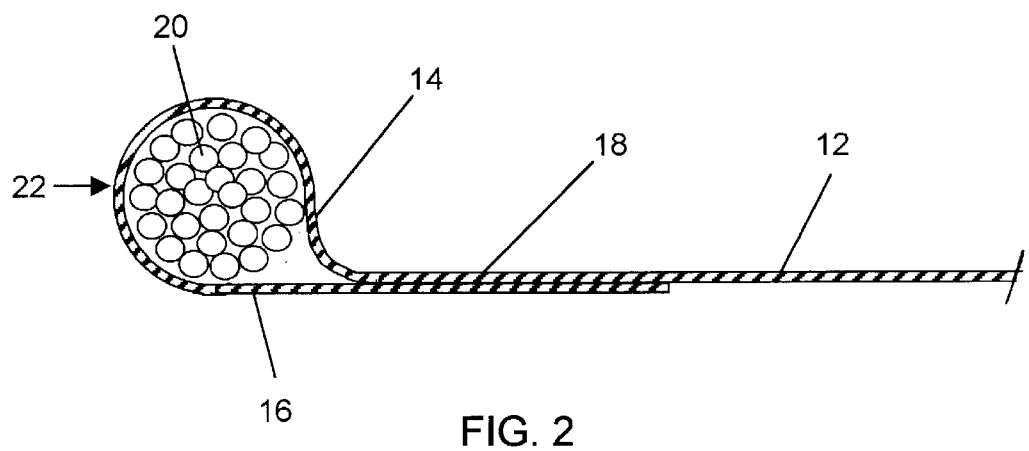
FIG. 2 is a cross-section along line 2—2 of FIG. 1.

Referring to the accompanying drawings, there is illustrated a mat 10. The main body of the mat is a rectangular sheet 12 of PVC coated nylon. The sheet has an integral peripheral sleeve 14 formed by folding an edge portion 16 of the sheet over and bonding it to the underside of the sheet along a bond line 18.

To provide a raised lip around the mat, a rope 20 extends the length of the sleeve to provide a continuous peripheral lip 22 around the mat 10.

In use, the mat is placed on a floor to be protected and a vehicle from which protection is sought is driven onto the mat. Any contaminants falling from the vehicle, for example snow, salt, water and oil, will fall onto the mat and be retained on the mat by the raised lip. When the vehicle is driven off the mat, the incompressible rope 20 around the edge will retain the contaminants on the mat.

When a sufficient body of contaminants has been collected on the mat, it may be pumped off using a suction pump.

Mats according to the invention can be made in any size for use under any type of vehicle or under plural vehicles. A mat may be used that will cover the complete floor of a garage.

While one embodiment of the present invention has been described in the foregoing, it is to be understood that other embodiments are possible within the scope of the invention and are intended to be included herein. The invention is to be considered limited solely by the scope of the appended claims.

What is claimed is:

1. A mat for placing on a floor to protect the floor from foreign material falling from a vehicles, said mat comprising an impervious sheet of flexible, puncture-resistant textile fabric with a synthetic resin matrix material larger in length and width dimensions than the vehicle, a sleeve extending around the periphery of the sheet, and a substantially incompressible rope extending along the sleeve, around the periphery of the sheet to provide an incompressible raised lip around the periphery of the mat.

2. A mat according to claim 1 wherein the impervious sheet comprises a nylon fabric coated with polyvinylchloride.

3. A mat according to claim 1 wherein the sleeve is integral with the sheet.

4. A mat according to claim 3 wherein the sleeve comprises edge portions of the sheet folded over and bonded to the sheet.

* * * * *